US011968967B2

(12) United States Patent
Sun

(10) Patent No.: US 11,968,967 B2
(45) Date of Patent: Apr. 30, 2024

(54) ROTATABLE FISHING ROD HANDLE DEVICE WITH ADJUSTABLE BENDING AND STRAIGHTENING

(71) Applicant: Weihai Timery Metal Industry Co., Ltd., Weihai (CN)

(72) Inventor: Shugang Sun, Weihai (CN)

(73) Assignee: Weihai Timery Metal Industry Co., Ltd., Weihai (CN)

( * ) Notice: Subject to any disclaimer, the term of this patent is extended or adjusted under 35 U.S.C. 154(b) by 232 days.

(21) Appl. No.: 17/239,605

(22) Filed: Apr. 25, 2021

(65) Prior Publication Data
US 2022/0110304 A1     Apr. 14, 2022

(30) Foreign Application Priority Data

Oct. 9, 2020  (CN) .......................... 202022247392.5

(51) Int. Cl.
A01K 87/08    (2006.01)
A01K 87/02    (2006.01)

(52) U.S. Cl.
CPC .............. *A01K 87/08* (2013.01); *A01K 87/02* (2013.01)

(58) Field of Classification Search
CPC ........ A01K 87/08; A01K 87/02; A01K 87/00; A01K 87/025; A01K 87/06; Y10T 403/32262; Y10T 403/32418; Y10T 403/32426; Y10T 403/32975; Y10T 403/32983; A45B 2017/005; F16B 7/0413; F16B 7/04; B25G 1/08; B25G 1/066; B25G 1/063; B25G 1/043; B25G 1/046

USPC ......... 403/1, 83, 84, 86, 104, 10, 9.1, 109.2, 403/109.3, 109.5, 9.6, 164, 165, 362
See application file for complete search history.

(56) References Cited

U.S. PATENT DOCUMENTS

| | | | | |
|---|---|---|---|---|
| 1,000,125 | A | * | 8/1911 | Schulz ...................... F16B 7/04 403/103 |
| 4,759,240 | A | * | 7/1988 | Lin ........................... B25F 5/02 81/177.85 |
| 5,515,754 | A | * | 5/1996 | Elkins ..................... B25G 1/066 81/177.9 |
| 6,039,126 | A | * | 3/2000 | Hsieh ........................ B66F 3/12 173/217 |

(Continued)

FOREIGN PATENT DOCUMENTS

| | | | | |
|---|---|---|---|---|
| DE | 102012109008 A1 | * | 9/2013 | ............ B25G 1/066 |
| EP | 0611007 A1 | * | 2/1994 | |
| TW | 1378851 B | * | 1/2010 | |

*Primary Examiner* — Darren W Ark
*Assistant Examiner* — Katelyn T Truong
(74) *Attorney, Agent, or Firm* — Bayramoglu Law Offices LLC

(57) ABSTRACT

A rotatable fishing rod handle device with adjustable bending and straightening includes a handle body, a wheel seat and a connecting rod, wherein a front end portion of the handle body is provided with a mounting hole inwardly. A rear end portion of the wheel seat is provided with a coupling shaft. The coupling shaft is located and rotatable in the mounting hole. A shaft body of the coupling shaft is provided with a groove, in which a latch protrusion and a spring are disposed. An end of the latch protrusion protrudes outward to a notch of the groove and the latch protrusion is elastically disposed in the groove through the spring. A first position limiting hole is formed at a position corresponding to the groove on the coupling shaft on a side wall of the handle body.

9 Claims, 1 Drawing Sheet

(56) References Cited

U.S. PATENT DOCUMENTS

| | | | | |
|---|---|---|---|---|
| 6,260,277 B1* | 7/2001 | Wu | ............ | A01G 3/02 |
| | | | | 30/232 |
| 7,328,635 B2* | 2/2008 | Hu | ............ | B25G 1/066 |
| | | | | 81/177.85 |
| 8,668,494 B2* | 3/2014 | Carron | ............ | A61C 1/185 |
| | | | | 433/109 |
| 2002/0176736 A1* | 11/2002 | Tsou | ............ | F16C 11/10 |
| | | | | 403/103 |
| 2004/0164670 A1* | 8/2004 | Nanni | ............ | A61C 1/18 |
| | | | | 313/503 |
| 2007/0214916 A1* | 9/2007 | Lee | ............ | B25B 23/0021 |
| | | | | 81/177.85 |
| 2007/0272060 A1* | 11/2007 | Schoenbeck | ............ | B25G 1/066 |
| | | | | 81/177.8 |
| 2008/0121074 A1* | 5/2008 | Hu | ............ | B25G 1/066 |
| | | | | 81/177.8 |
| 2009/0060639 A1* | 3/2009 | Jan | ............ | F16C 11/0623 |
| | | | | 403/141 |
| 2010/0015568 A1* | 1/2010 | Carron | ............ | A61C 1/12 |
| | | | | 433/130 |
| 2013/0239757 A1* | 9/2013 | Chen | ............ | B25G 1/066 |
| | | | | 81/177.4 |
| 2014/0000422 A1* | 1/2014 | Huang | ............ | B25G 1/00 |
| | | | | 81/489 |
| 2014/0230610 A1* | 8/2014 | Chen | ............ | B25G 1/066 |
| | | | | 81/177.7 |

* cited by examiner

ROTATABLE FISHING ROD HANDLE DEVICE WITH ADJUSTABLE BENDING AND STRAIGHTENING

CROSS REFERENCE TO THE RELATED APPLICATIONS

This application is based upon and claims priority to Chinese Patent Application No. 202022247392.5, filed on Oct. 9, 2020, the entire contents of which are incorporated herein by reference.

TECHNICAL FIELD

The present invention relates to handle implements, and in particular to a rotatable fishing rod handle device with adjustable bending and straightening.

BACKGROUND

A holder that supports the fixing of a fishing rod and the adjustment of an angle of a support rod is often used to free one's hands while fishing. There are currently available holder devices combined with a wheel seat and a handle whose position may be limited through the engagement of a screw bolt or a sliding key. In use, the sliding key version typically has to be pushed back and forth, while the screw bolt requires use of a tool. Neither design is quick and convenient enough to operate. Thus, it is highly desirable to provide a fishing rod handle device with adjustable bending and straightening for a fishing rod, which can not only resolve problems of simplifying the fixing of the fishing rod and the adjustment angle of the support rod, but also change the bending and straightening quickly and conveniently. Such a handle device should be simple in operation and inexpensive to manufacture as well.

SUMMARY

In order to resolve the shortcomings existing in the prior art, the present invention provides a rotatable fishing rod handle device with adjustable bending and straightening.

In order to resolve the above technical problems, a technical solution adopted by the present invention is as follows: a rotatable fishing rod handle device with adjustable bending and straightening, includes a handle body, a wheel seat and a connecting rod. A front end portion of the handle body is provided with a mounting hole inwardly. A rear end portion of the wheel seat is provided with a coupling shaft. The coupling shaft is located and rotatable in the mounting hole. A shaft body of the coupling shaft is provided with a groove, in which a latch protrusion and a spring are disposed. An end of the latch protrusion protrudes outward to a notch of the groove and the latch protrusion is elastically disposed in the groove through the spring.

A first position limiting hole is formed at a position corresponding to the groove on the coupling shaft on a side wall of the handle body. A second position limiting hole is formed at a position symmetrical to the first position limiting hole on the side wall of the handle body. The fishing rod handle device is in a straight connection state when the latch protrusion is rotated to the first position limiting hole, and the fishing rod handle device is in a bending connection state when the latch protrusion is rotated to the second position limiting hole.

Further, the first position limiting hole has a shape and a size consistent with those of the notch of the groove, and the second position limiting hole has a shape and a size consistent with those of the notch of the groove.

Further, an annular dented portion is disposed around each of the first position limiting hole and the second position limiting hole on the side wall of the handle body, and the annular dented portion facilitates the latch protrusion to be completely pressed downward to an inside of the groove.

Further, a central axis of the connecting rod and a central axis of the wheel seat form an included angle α, and the included angle is 15-20°.

Further, a central axis of the handle body and a central axis of the mounting hole form an included angle β, and the included angle β is 15-20°.

Further, the side wall of the handle body is provided with a screw through hole facing downward, the screw through hole communicates with the mounting hole, and a screw bolt is disposed in the screw through hole.

Further, a retaining groove is disposed on the coupling shaft along a circumferential direction of its shaft body, and an end of the screw bolt passes through the screw through hole and is latched and disposed in the retaining groove.

The present invention discloses a rotatable fishing rod handle device with adjustable bending and straightening. A rotating function of the device is implemented by rotatably connecting the wheel seat and the handle body through the coupling shaft. A straight state or a bending state is implemented by angle design of the wheel seat and the handle body. The positioning is implemented through the engagement and position limiting of the latch protrusion and the position limiting hole, which can be implemented only by pressing the latch protrusion to rotate while switching the state, and the operation is substantially convenient and fast.

Figure 1:
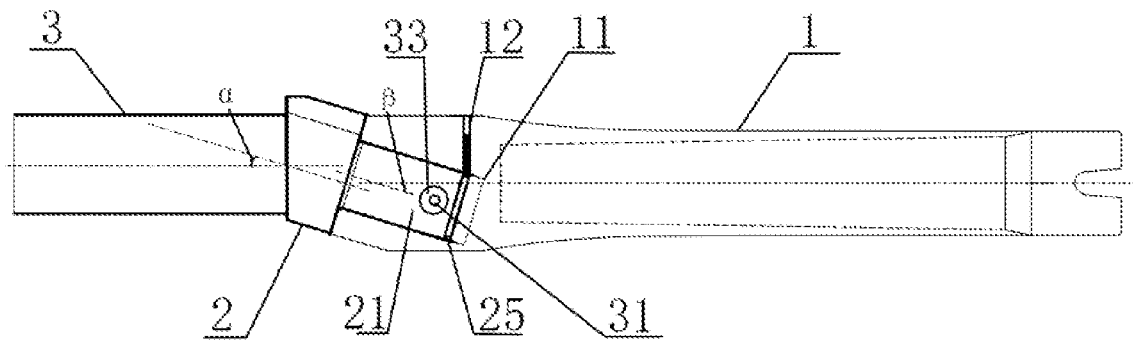
FIG. 1 is a schematic diagram of a structure in a straight connection of the present invention.

In the drawings: 1. handle body; 11. mounting hole; 12. screw through hole; 2. wheel seat; 21. coupling shaft; 22. groove; 23. latch protrusion; 24. spring; 25. retaining groove; 3. connecting rod; 31. first position limiting hole; 32. second position limiting hole; 33. annular dented portion.

DETAILED DESCRIPTION OF THE EXEMPLARY EMBODIMENTS

The present disclosure will be further illustrated below in detail in conjunction with the accompanying drawings and the specific embodiments.

Figure 2:
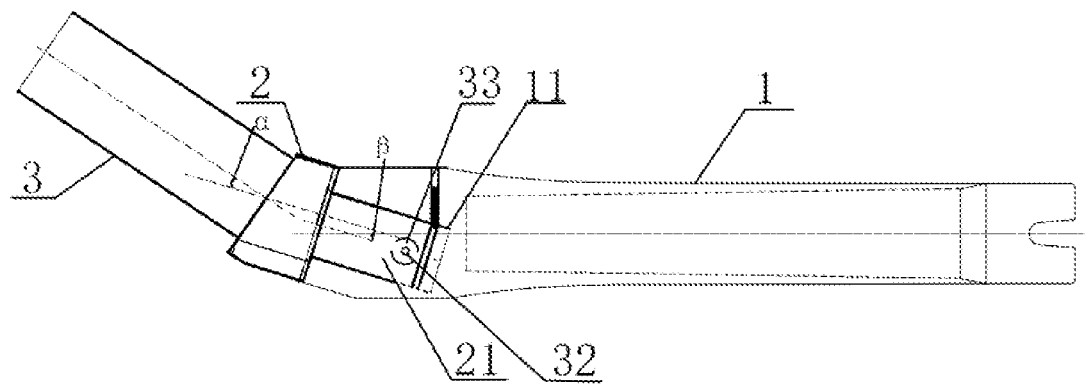
FIG. 2 is a schematic diagram of a structure in a bending connection of the present invention.
Figure 3:
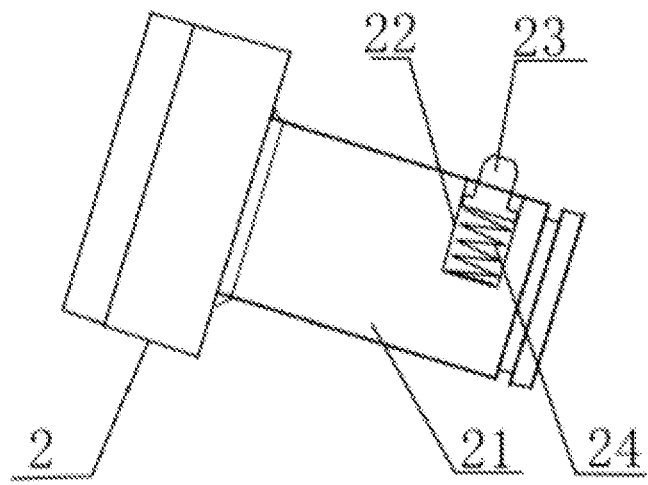
FIG. 3 is a cross sectional view of a structure of a wheel seat.

As shown in FIGS. 1-3, a rotatable fishing rod handle device with adjustable bending and straightening disclosed by the present invention includes the handle body 1, the wheel seat 2 and the connecting rod 3, wherein a front end portion of the handle body 1 is provided with the mounting hole 11 inwardly. A rear end portion of the wheel seat 2 is provided with the coupling shaft 21. The coupling shaft 21 is located in the mounting hole 11. An inner wall of the mounting hole is smooth and in a cylindrical shape. An outer wall of the coupling shaft 21 is smooth and in a cylindrical shape as a whole. The coupling shaft 21 can rotate in the mounting hole. The rear end of the handle body 1 is fixed at a hull or shore, and the connecting rod 3 is used for fixing the fishing rod. A shaft body of the coupling shaft 21 is provided with the groove 22, in which the latch protrusion 23 and the spring 24 are disposed, and the latch protrusion 23 is elastically disposed in the groove 22 through the spring 24.

The first position limiting hole 31 is formed at a position corresponding to the groove 22 on the coupling shaft 21 on a side wall of the handle body 1, and the second position limiting hole 32 is formed at a position symmetrical to the first position limiting hole 31 on the side wall of the handle body 1. Preferably, the first position limiting hole 31 has a shape and a size consistent with those of a notch of the groove 22, and the second position limiting hole 32 has a shape and a size consistent with those of the notch of the groove 22. The annular dented portion 33 is disposed around each of the first position limiting hole 31 and the second position limiting hole 32 on the side wall of the handle body 1, and the annular dented portion 33 facilitates the latch protrusion 23 to be completely pressed downward to an inside of the groove 22.

As shown in FIG. 1, when the pressed latch protrusion 23 rotates to the first position limiting hole 31, the fishing rod handle device is in a straight connection state. A central axis of the connecting rod 3 connected on the wheel seat 2 and a central axis of the wheel seat 2 form an included angle α. Preferably, the included angle α is 15-20°, and more preferably, the included angle α of the present invention is 17°, while a central axis of the handle body 1 and a central axis of the mounting hole 11 form an included angle β. Preferably, the included angle β is 15-20°, and more preferably, the included angle β of the present invention is also 17°. As shown in FIG. 1, when the pressed latch protrusion 23 rotates to the second position limiting hole 32, the fishing rod handle device is in a bending connection state. The central axis of the connecting rod 3 connected on the wheel seat 2 and the central axis of the wheel seat 2 form the included angle α. Preferably, the included angle α is 15-20°, while the central axis of the handle body 1 and the central axis of the mounting hole 11 form the included angle β. Preferably, the included angle β is 15-20°. The angle between the handle body and the wheel seat changes 30-40° in the bending connection state compared with the straight connection state.

In the present invention, the included angle α is 17°, and the included angle β is 17°. Because the central axis of the wheel seat 2 and the central axis of the mounting hole 11 are in a parallel state, it is inferred that the handle body 1 of and the connecting rod 3 of the present invention form an angle of 146° according to a principle that a sum of internal angles of a triangle is 180°, thereby realizing the effect of bending connection.

Preferably, the side wall of the handle body 1 is provided with the screw through hole 12 facing downward. The screw through hole 12 communicates with the mounting hole 11. The screw bolt 13 is disposed in the screw through hole 12. The retaining groove 25 is disposed on the coupling shaft 21 along a circumferential direction of its shaft body, and an end of the screw bolt 13 passes through the screw through hole 12 and is latched in the retaining groove 25. Thus, it is able to effectively prevent the coupling shaft 21 from falling off from the handle body 1 during a rotating process for the switch of the bending connection state and the straight connection state.

For the rotatable fishing rod handle device with adjustable bending and straightening disclosed by the present invention, a rotating function of the device is implemented by rotatably connecting the wheel seat with the handle body through the coupling shaft, and the straight state or the bending state is implemented by angle design of the wheel seat and the handle body, thereby satisfying various usage demands, and it is more flexible for use. While changing the state of the handle device, it can be achieved by pressing the latch protrusion to rotate. Compared with the conventional positioning that is achieved through the engagement and position limiting of the screw bolt and the sliding key, the operation in the present invention is more convenient and quick for the positioning achieved through the engagement and position limiting of the latch protrusion and the position limiting hole.

The above-described embodiments are not the limitation to the present invention, and the present invention is not limited to the above-described embodiments. Changes, modifications, additions or replacements made by those skilled in the art within the scope of the technical solution of the present invention all fall within the protection scope of the present invention.

What is claimed is:

1. A rotatable fishing rod handle device with adjustable bending and straightening, comprising a handle body, a wheel seat and a connecting rod, wherein a front end portion of the handle body is provided with a mounting hole inwardly, a rear end portion of the wheel seat is provided with a coupling shaft, and the coupling shaft is located and rotatable in the mounting hole, wherein a shaft body of the coupling shaft is provided with a groove, and a latch protrusion and a spring are disposed in the shaft body, an end of the latch protrusion protrudes outward to a notch of the groove, and the latch protrusion is elastically disposed in the groove through the spring; and a first position limiting hole is formed on a side wall of the handle body at a position corresponding to the groove on the coupling shaft, a second position limiting hole is formed on the side wall of the handle body at a position symmetrical to the first position limiting hole, the rotatable fishing rod handle device is in a straight connection state when the latch protrusion is rotated to the first position limiting hole, and the rotatable fishing rod handle device is in a bending connection state when the latch protrusion is rotated to the second position limiting hole, wherein an annular dented portion is coaxially disposed around each of the first position limiting hole and the second position limiting hole on the side wall of the handle body and the annular dented portion is coaxially aligned with the latch protrusion when the latch protrusion is rotated into the respective position limiting hole, and the annular dented portion facilitates the latch protrusion to be completely pressed downward to an inside of the groove, wherein the side wall of the handle body is provided with a screw through hole facing downward, the screw through hole communicates with the mounting hole, a screw bolt is disposed in the screw through hole, a retaining groove is disposed on the coupling shaft along a circumferential direction of the shaft body of the coupling shaft, an end of the screw bolt passes through the screw through hole and is latched and disposed in the retaining groove, and the screw bolt slides in the retaining groove while the coupling shaft rotates; and wherein an angle between a central axis of the screw through hole and a central axis of the mounting hole being less than 90 degrees.

2. The rotatable fishing rod handle device of claim 1, wherein the first position limiting hole has a shape and a size consistent with a shape and a size of the notch of the groove, and the second position limiting hole has a shape and a size consistent with the shape and the size of the notch of the groove.

3. The rotatable fishing rod handle device of claim 1, wherein a central axis of the connecting rod and a central axis of the wheel seat form an included angle α, and the included angle α is 15-20°.

4. The rotatable fishing rod handle device of claim 3, wherein a central axis of the handle body and a central axis of the mounting hole form an included angle β, and the included angle β is 15-20°.

5. The rotatable fishing rod handle device of claim 1, wherein the wheel seat is attached to a periphery of the connecting rod.

6. The rotatable fishing rod handle device of claim 1, wherein the wheel seat is attached to a periphery of the handle body.

7. The rotatable fishing rod handle device of claim 1, wherein the wheel seat is attached to a periphery of the connecting rod and to a periphery of the handle body.

8. The rotatable fishing rod handle device of claim 1, wherein walls of the retaining groove are at a different angle than the central axis of the screw through hole relative to the central axis of the mounting hole.

9. The rotatable fishing rod handle device of claim 1, wherein a central axis of the latch protrusion is perpendicular to a central axis of the handle body.

\* \* \* \* \*